United States Patent [19]

Frank

[11] 4,347,836
[45] Sep. 7, 1982

[54] SOLAR HEATING SYSTEM
[75] Inventor: Arthur M. Frank, Plainview, N.Y.
[73] Assignee: Grumman Aerospace Corporation, Bethpage, N.Y.
[21] Appl. No.: 122,935
[22] Filed: Feb. 20, 1980

Related U.S. Application Data

[63] Continuation-in-part of Ser. No. 885,356, Mar. 13, 1978, abandoned.

[51] Int. Cl.³ .............................................. F24J 3/02
[52] U.S. Cl. ................................ 126/450; 126/448
[58] Field of Search ............... 264/46.6, 46.8, 45.5; 126/444, 445, 449, 432, 447, 448, 450

[56] References Cited
U.S. PATENT DOCUMENTS

| | | | |
|---|---|---|---|
| 3,965,887 | 6/1976 | Gramer | 126/450 |
| 3,986,991 | 10/1976 | Kolakowski et al. | 264/45.5 |
| 4,108,159 | 8/1978 | Wendel | 126/448 |
| 4,109,711 | 8/1978 | Kleine et al. | 126/444 |
| 4,194,491 | 3/1980 | Randall | 126/448 |
| 4,279,244 | 7/1981 | McAlister | 126/450 |

FOREIGN PATENT DOCUMENTS 2298067  8/1976  France ............................ 126/432

Primary Examiner—James C. Yeung
Attorney, Agent, or Firm—Richard G. Geib; Mellor A. Gill; Bruce B. Brunda

[57] ABSTRACT

A solar heating system for preheating water which may be used in conjunction with an existing hot water heater. The use of potable water as the heating fluid renders the use of a heat exchanger unit unnecessary. A novel collector unit is disclosed which includes a molded plastic collector frame with integral fluid passageway and a thermally compatible absorber plate bonded to the frame. The use of thermally compatible collector components serves to minimize bondline strains due to uneven thermal expansion of the materials. Reliable and continuous operation of the system is, therefore, possible over a wide range of temperature conditions. Diagonally opposite standoff regions provide even liquid flow across the collector surface regardless of which way the collector is turned. The durable unitized collector design eliminates the need for frame members, additional fluid conduits, specially manufactured collector plates and multiple collector sealing layers. The invention provides an exceptionally low cost, material intensive solar heating system.

13 Claims, 10 Drawing Figures

SOLAR HEATING SYSTEM

CROSS REFERENCE

This application is a continuation-in-part of Applicant's previous application, Ser. No. 885,356, filed Mar. 13, 1978, now abandoned.

BACKGROUND OF THE INVENTION

There has been many previous solar collector systems described which provide energy savings particularly for meeting heating or hot water requirements. Although such systems have been known for some time, their implementation has been inhibited by the high cost of solar collector units and the relatively lower cost of common fossil fuels. With the cost of all fuels now escalating, solar heating units have become more attractive, yet their usage is still restricted due in major part to the substantial initial expense involved in purchasing collector units.

Existing solar collectors tend to be either one of three types. Concentration type collectors localize the sun's light on a particular heat conductive member which transfers the heat to a circulating fluid which can then communicate the heat to a receptor. The labor and material expense involved in the manufacture of these focusing collectors make them impractical for many applications. In addition to the economic considerations, typical concentration collectors are further limited in that they are effective for only a narrow angle of sunlight outside of which their effectiveness decreases dramatically.

Metallic pipe collectors typically include a black, fluid carrying pipe spaced between a glass or plastic cover and an insulated base. These devices often employ coiled piping or zigzagging in convolutions in a given plane requiring numerous flow restricting elbows and considerable lengths of metallic piping. Thermal inefficiencies result from the excessive spacing of the convolutions which permits radiation of much of the solar energy back into the atmosphere. Economic inefficiencies further include the excessive labor and material costs inherent in the production of the device.

The present invention is of the third variety utilizing a flat plate collector. This type system makes use of flat surfaces to absorb the solar energy, and can receive light from a wide variety of angles. Although a considerable number of flat plate collector systems exist, none of these systems use the unitized mode of construction operable over wide temperature ranges as does the present invention. H. E. Stoutin, U.S. Pat. No. 3,918,430, teaches a light weight plastic film solar collector utilizing a plate collector in a plastic frame. Stout, however, does not disclose the use of fluid passageways integral to the plastic frame, but rather requires the installation of multiple film layers and further necessitates the use of a fabricated solar ply which makes the system more expensive. In addition, the use of a plastic foam insulation base in the patent results in undesirable temperature limitations of which the inventors were apparently unaware. E. W. Gough in U.S. Pat. No. 3,076,450, teaches a plastic solar heater. This patent uses a polyurethane foam plastic base which includes an undulated top that defines a series of parallel water channels. The application of a black plastic liner to the surface of the plastic base, as described in the reference, requires additional manufacturing and results in direct contact between the heat conducting fluid and the thin plastic liner. If such contact is continuous, the result is likely to be the deterioration of the plastic liner necessitating extensive repair procedures to the replacement of the entire unit.

Other prior art devices, including that described in U.S. Pat. No. 3,965,887 issued to Gramer, et al., discloses the use of a plastic base member in conjunction with a metallic absorber plate. In such a heat attracting system wherein materials having widely different thermal expansion rates are joined, their differing reactions to the applied cause stress to develop along their contact surfaces.

As one skilled in the art will recognize, stagnation temperatures in excess of 300° F. may develop within a drained or undrained solar collector. These temperatures cause considerable stress to develop along the bond line between the heat absorbent plate and base member. Reliable operation of the device is, therefore, limited to a narrower temperature bond with a substantial likelihood of bond line failure at the higher, stagnation temperatures. Similar limitations may develop with the use of glass/plastic devices, or even plastic/plastic devices wherein the materials used have differing thermal expansion coefficients.

In the system proposed by Gramer, this problem is recognized and addressed through the use of elastic adhesive means to bond the absorber plate to the base member. This construction represents one approach to preserving bonding characteristics in the face of the grossly uneven expansion of plastic and metallic elements. The present invention by contract provides high temperature operative capacity through the use of thermally compatible plastic materials, thereby eliminating the need for elastic adhesive means.

Although the above described systems have assisted in solving problems present in the design of an efficient solar collector, neither these nor other systems proved entirely satisfactory for the reason that no truly cost effective low pressure collector system has been proposed until the emergence of the present system.

While the use of plastic components has been proposed for use in connection with one or more portions of a solar collector system, no previous constructions have been proposed which so match collector components according to their thermal characteristics to allow continuous system operation through both high and low temperature conditions.

Accordingly, it is an object of the present invention to provide a new and improved solar heating system which is operative over wide temperature ranges.

It is another object of the present invention to provide a durable non-corrosive solar heating system which is not easily damaged, can be manufactured at low cost, and can utilize copper plumbing.

It is also an object of the present invention to provide an inexpensive and self-draining solar heating system requiring minimal maintenance and suitable for high temperature operation associated with shut down.

It is a further object of the present invention to provide a reliable solar collector assembly wherein bonding between the absorber plate and the collector base is maintained over a wide range of operating temperatures.

It is another object of the present invention to provide a solar collector assembly in which the various components are composed of thermally compatible materials which react similarly to the ambient thermal conditions.

A further object of the present invention is to provide a solar collector assembly wherein even liquid flow distribution is assured regardless of how the assembly is turned.

It is a still further object of this invention to provide a solar collector system which utilizes an inexpensive molded plastic collector base which makes fluid connection, installation, interconnection of multiple units and any necessary repair relatively simple and extremely cost effective in both terms of labor and materials.

In accomplishing the foregoing objects, there has been provided, according to one embodiment of the invention, a solar collector assembly having a molded one piece collector assembly frame including an upper ribbed surface defining a plurality of capillary passages. An absorber plate is secured to the upper ribbed surface of the frame to seal the capillary passages and to transfer heat to the liquid therein. The collector frame and absorber plate are composed of identical or similar plastic materials such that both components exhibit similar thermal expansion characteristics, thereby minimizing bondline stress between the components. Thermal insulating material may be interposed beneath the assembly frame upper surface. Even fluid distribution across the collector surface is accomplished by forming standoff regions in diagonally opposite corners of the frame upper ribbed surface. Even fluid distribution across the collector upper surface is thereby assured regardless of how the assembly is turned.

These and other objects and advantages of the invention will be apparent from the following description and claims, the novelty consisting of the feature of construction, combination of parts, the unique relations of the members and the operation thereof, all as more completely outlined herein and particularly pointed out in the appended claims.

DETAILED DESCRIPTION

Figure 1:
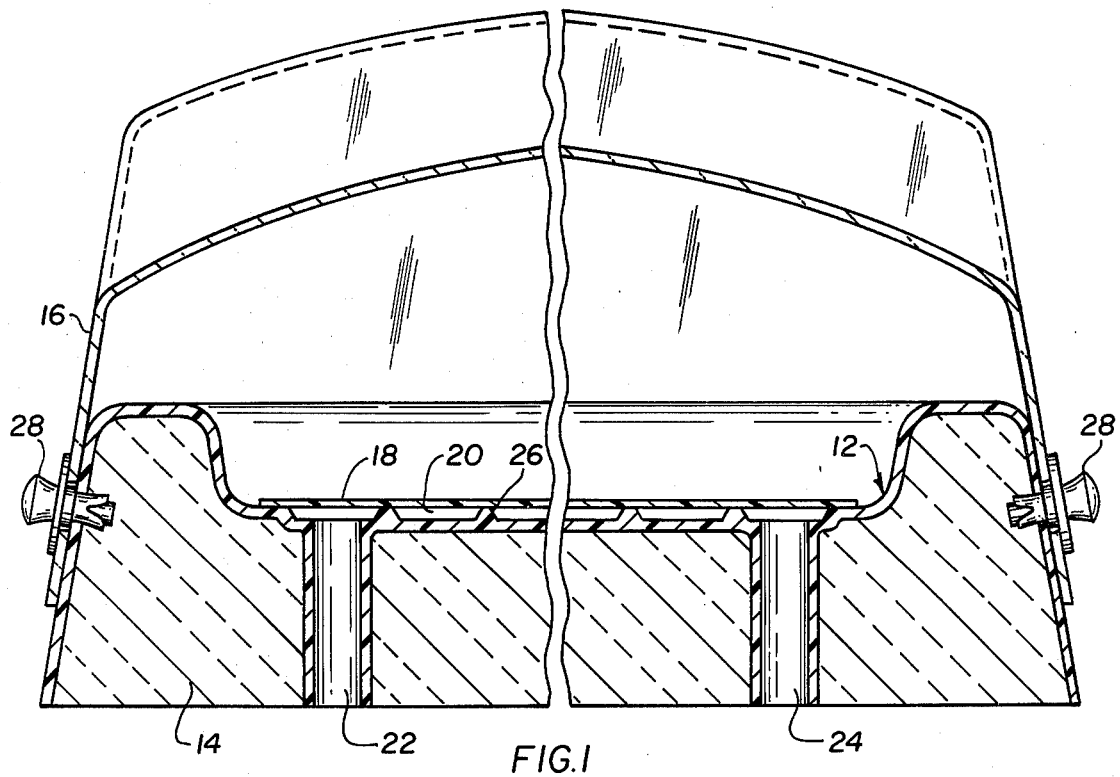
FIG. 1 is a fragmentary sectional view taken through the inlet and outlet port of a solar collector assembly constructed in accordance with the present invention showing details of the collector construction.

Referring now to the drawings in detail, it will be seen that the embodiment of the invention which has been illustrated in FIG. 1 comprises molded plastic collector frame 12 of suitable dimensions having an interior cavity 14 with collector assembly cover 16 detachably mounted to the side walls of the collector assembly. Collector plate 18 is mounted on the surface of frame 12.

Collector frame 12 is composed of plastic material capable of withstanding high temperatures and includes a ribbed top surface portion defining a plurality of capillary water passages 20. Fluid inlet passageway 22 is designed to communicate the heating fluid to capillary passages 20 where it comes in contact with the lower surface of collector plate 18. Fluid discharge passageway 24 communicates the heating fluid from the collector assembly back into the heating system loop. Standoffs 27 provide for a manifold type effect permitting more even fluid flow distribution across capillary passages 20. The addition of standoff regions allows more even distribution among the capillary passages therefore increasing the efficiency of the collector. By orientating the standoff regions and connecting passageways in diagonally opposite relationship, the collector is assured of even fluid distribution regardless of how the assembly is turned. The upper surface design of the present invention, therefore, allows maximum operating capacity irrespective of the orientation of the unit. In comparison to other solar collectors which won't fill evenly when turned sideways, the present invention insures that one port is always at the top and that the troughs fill evenly.

Frame 12 is backed with a high temperature insulating foam such as isocyanurate foam interposed in interior cavity 14. The insulating foam serves to keep the heating fluid at a higher temperature and, therefore, minimize heat losses associated with the assembly.

The sides of frame 12 are slightly angled to permit easy removal from the mold, stacking during manufacture and shipping, and to permit simple assembly between the frame 1 and collector assembly cover 16.

Figure 2:
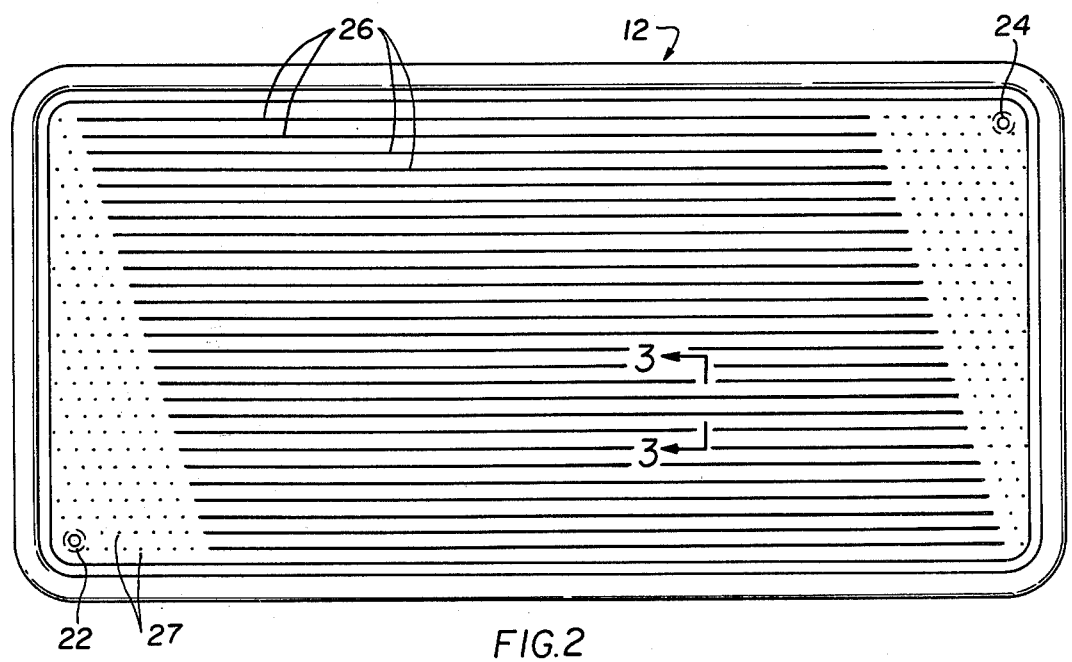
FIG. 2 is a front elevation view of the molded collector frame showing the ribbed upper surface.
Figure 3:
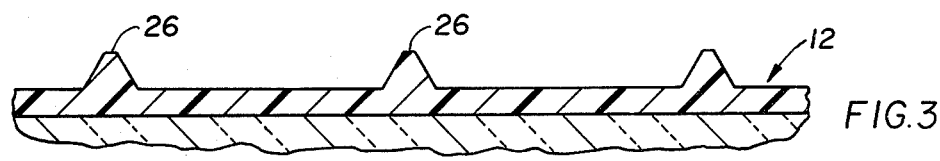
FIG. 3 is an enlarged sectional view taken along 3—3 of FIG. 2 showing details in the construction of the ribbed collector frame surface.

Ribs 26, shown in more detail in FIG. 2 and FIG. 3 serve a dual purpose of defining capillary passages 20 and supporting collector plate 18. The ribs are an integral portion of frame 12 being formed as to optimize flow distribution to provide maximum exposure of the heating fluid to the lower surface of plate 18 while consistent with cost intensive production. Ribs 26 are bonded to collector plate 18 to form a leakproof assembly therewith. Plate 18 is composed of a thin sheet of plastic heat absorptive material which can be provided with a solar selective black coating on its upper surface to increase solar energy absorption. The plate 18 is composed of a plastic material which is identical to the collector frame material or exhibits similar thermal expansion characteristics. The use of such thermally compatible materials serves to minimize bondline strains between the absorber plate and the collector frame. This construction allows reliable system service for extended periods and over a wide range of temperature variations.

The overall weight and cost of the apparatus may, therefore, be reduced through the utilization of injection molding techniques to form the plastic components used in place of the metallic or glass elements heretofore employed. The use of elastic adhesives also becomes unnecessary.

Figure 4:
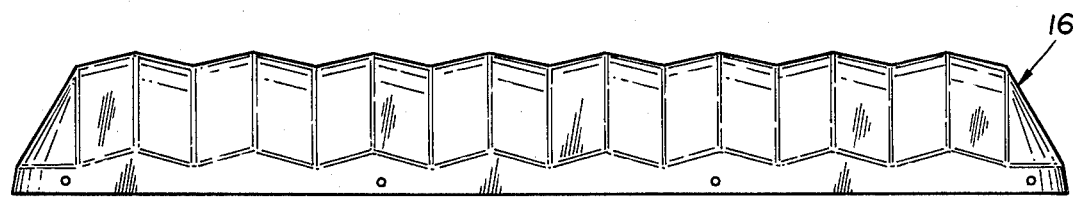
FIG. 4 is a view of a cross section of the collector assembly cover.
Figure 5:
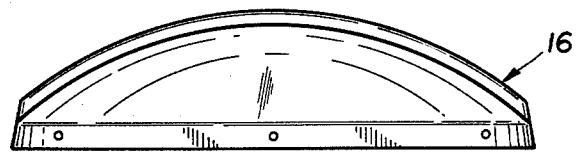
FIG. 5 is a side view in cross section of the collector assembly cover.
Figure 6:
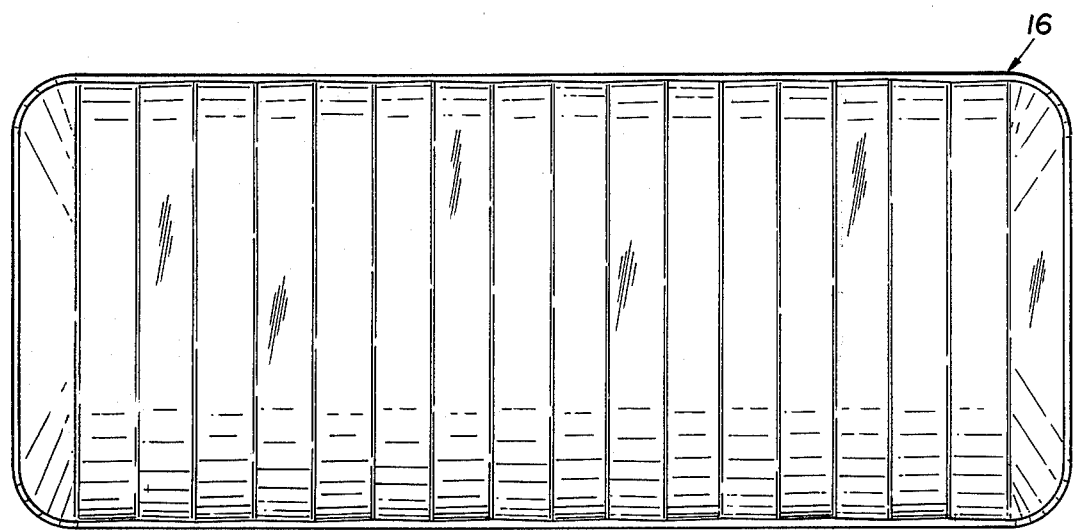
FIG. 6 is a top view of the collector assembly cover.

FIGS. 4, 5 and 6 show the construction of collector assembly cover 16 in detail. The cover is composed of a thin transparent molded plastic being crowned or ribbed to improve appearance and add the strength necessary to withstand the loads encountered in shipping, installation and operation. If desired, multiple covers of similar or different designs may be used without departing from the spirit of the invention. The cover is shown attached to the frame in FIG. 1 utilizing fasteners 28 along the sides.

Figure 7:
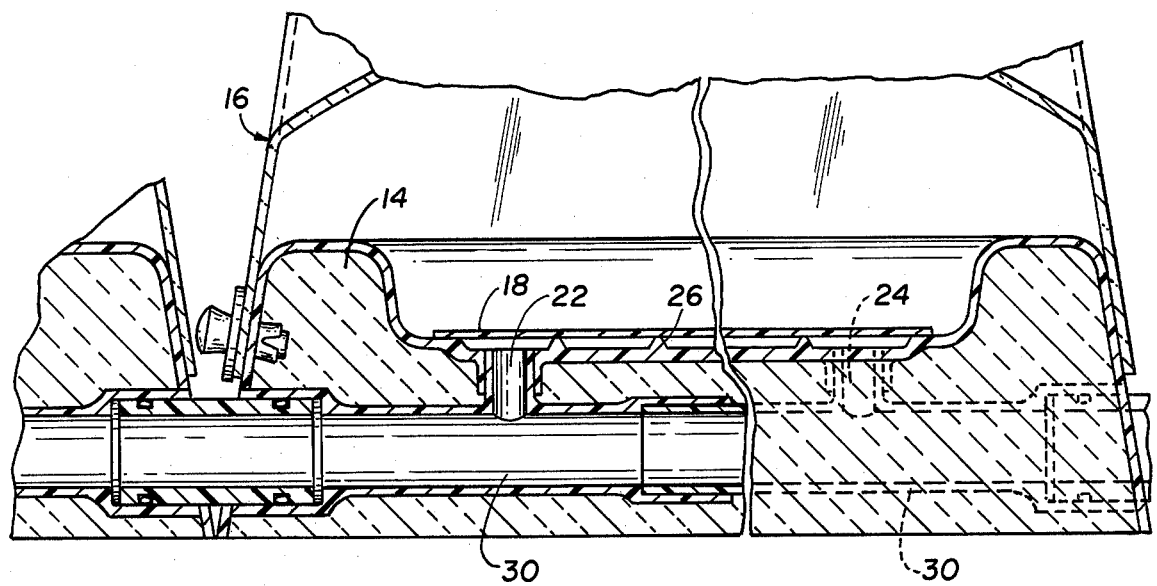
FIG. 7 is a fragmentary sectional view of an alternative embodiment of a solar collector assembly showing details of the assembly.

FIG. 7 illustrates an alternative construction of frame 12 incorporating integral manifolding 30 used in order to simplify installation of multiple collector assembly units.

Figure 8:
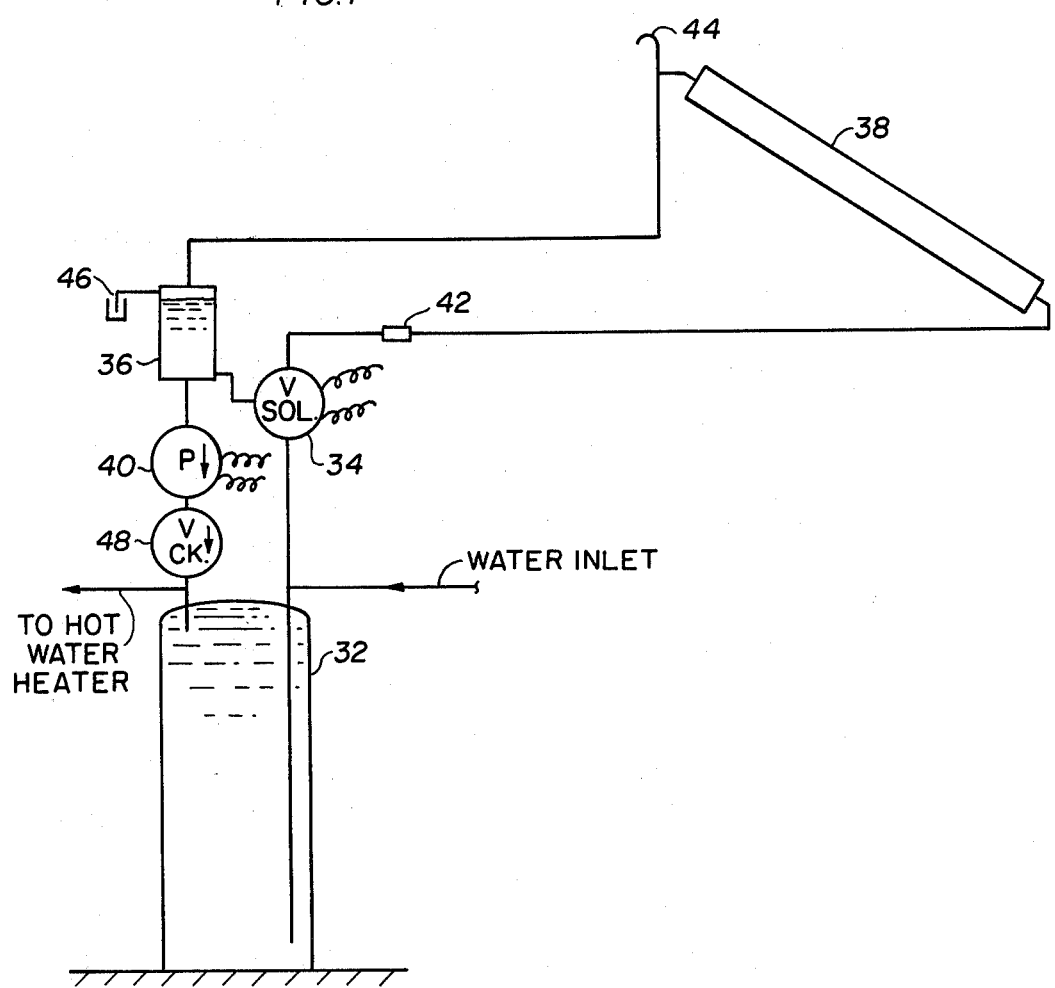
FIG. 8 is a schematic diagram of a solar heating system for a pressurized hot water supply constructed in accordance with the present invention.
Figure 9:
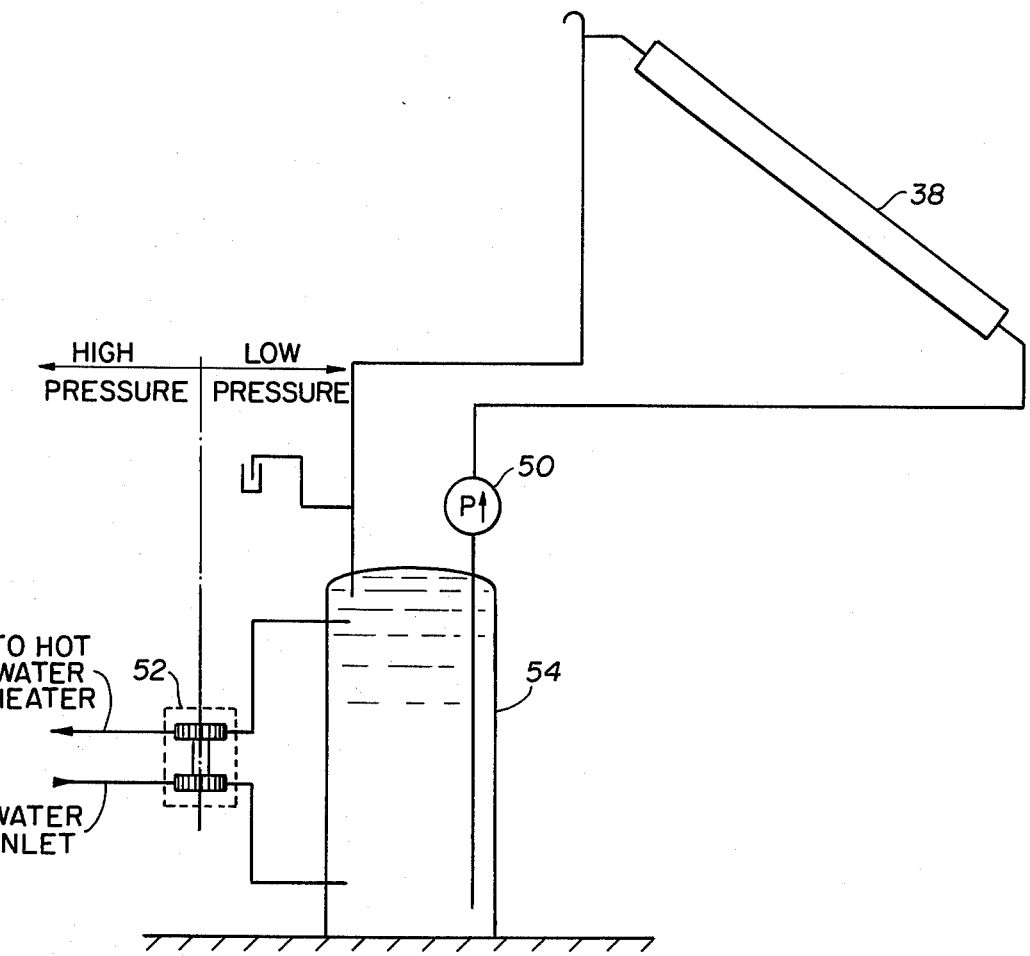
FIG. 9 is a schematic diagram of an alternative embodiment of the present invention illustrating the use of the same with a low pressure hot water preheater.

FIG. 8 and FIG. 9 are schematic representations of domestic hot water systems that permit the use of the low cost, low pressure solar collector previously described, in a highly efficient manner by eliminating the need for a heat exchanger between the high pressure water supply and the low pressure collector system. FIG. 9 depicts a system utilizing a pump to repressurize the water that has passed through the collector, back to system pressure.

Insulated preheater tank 32 is of standard commercial design providing pressurized hot water to an existing hot water heater. Three way solenoid valve 34 is operated by a temperature difference between the water in preheater 32 and in solar array 38. When the temperature of the solar array 38 exceeds the water temperature in preheater tank 32, valve 34 operates to allow the pressurized low temperature water input to pass through the now open solenoid valve 34 and into the solar array at low pressure. Restricted orifice 42 serves to control the flow of water into the array.

The solar array 38 is positioned above the remainder of the system so that when water is not being pumped through the collector loop, array 38 drains into small insulated tank 36. Pump 40 is activated by the water level in insulated tank 36 and operates to pump water from unpressurized insulated tank 36 into pressurized preheater tank 32 as the solar array drains. Vent 44 and drain 46 operate to facilitate this drainage by creating an air space in the upper portion of insulated tank 36. Check valve 48 operates to prevent the flow of water from the pressurized preheater into the collector loop.

FIG. 9 depicts a two pump hot water system where the preheater tank 54 operates at low pressure permitting a less expensive metal or even a plastic tank to be used. Pump 50 is utilized to pump water through the solar collector array 38 while pump 52 operates when usage demands hot water. Pump 52 does not have to be boosted since it can deliver water at slightly reduced pressure without the user being aware of the change.

Figure 10:
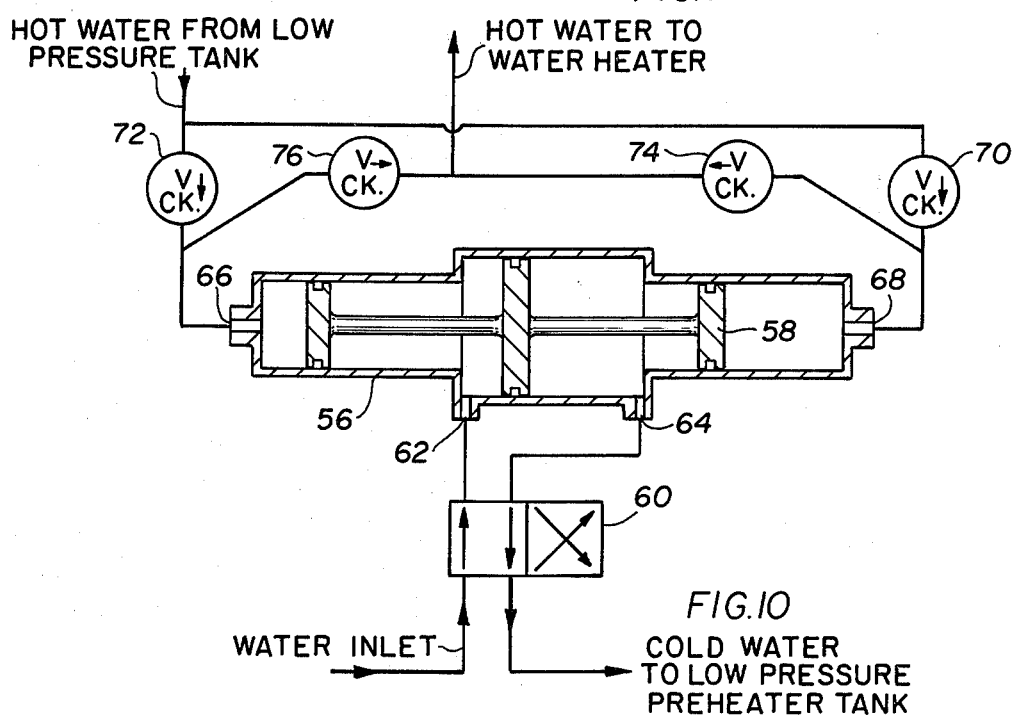
FIG. 10 is an illustration of a combination unboosted pressure reducer and unboosted pump assembly for use in the system of FIG. 9.

An unboosted pump assembly is illustrated in detail in FIG. 10. Inside pump body assembly 56 piston assembly 58 longitudinally traverses the assembly responsive to alternating input flows. Mechanical valve 60 acts as a logic valve channeling the cold water input to ports 62 and 64 alternatively depending upon the position of the piston. The cold water output leaves the pump assembly after logic valve 60 alternates the input through the same port it entered, now being reduced in pressure. Hot water from low pressure tank 54 enters the pump assembly through ports 66 and 68 alternatively. As the low pressure hot water enters one portion of the assembly, it is being discharged from another portion, due to the motion of the piston assembly responding to the high pressure inputs through ports 62 and 64. The difference in the cross sectional area of compressed portions of the interior pump assembly results in increased discharge pressures in the smaller portions of the assembly. The hot water being discharged from the assembly is thereby pressurized to approximately the pressure of the cold water input and is directed from ports 66 and 68 towards a standard domestic hot water heater. Check valves 70, 72, 74 and 76 operate to insure that the low pressure hot water from the solar array does not intermix with the pressurized hot water flow to the external hot water heater.

It is to be understood, however, that a great number of variations may be made in the invention without departing from its spirit and scope. For example, the restricted orifice 42 and pump 40 can be replaced by a single combination pressure reducer and booster pump assembly interposed between the input and output conduits to preheater tank 32. Additional changes in size, shape or modules can also be utilized within the scope of the present invention.

Having described an operative construction for the invention, it is now desired to set forth the intended protection sought by these Letters Patent in the appended claims that follow:

What is claimed is:

1. A solar collector assembly of thermally compatible material operable over wide temperature variations and having fluid input and output ports comprising:
    a molded one piece collector assembly frame having oblique, depending side walls and a ribbed upper surface forming a plurality of passages in said upper ribbed surface;
    an absorber plate of material thermally compatible with said frame bonded to said frame on said ribbed surface to be contiguous to said upper ribbed surface such that capillary passages are formed between said frame and plate with a leakproof seal formed therewith;
    an input passageway internal to said frame extending from the input port of said frame to said capillary passages so as to place said absorber plate in fluid communication with the input port;
    an outlet passageway integral to said frame and connecting said capillary passages to the output port to permit the flow of fluid from said capillary passages;
    an interior cavity integral to said frame being defined by a bottom surface and the side walls of said frame;
    a transparent molded collector assembly cover detachably mounted to said frame to enclose the upper surface of said frame;
    mounting means attachable to the surface of said cover for securing said cover to said collector assembly frame, and
    high temperature insulation material in said interior cavity and contacting the bottom surface of said frame.

2. The assembly of claim 1 wherein said absorber plate is secured to said frame by means of continuous bonding along their common surfaces.

3. The assembly of claim 1 wherein said absorber plate is coated on its upper surface with a selective film to enhance solar energy absorption and retention.

4. The assembly of claim 1 wherein said mounting means comprises a plastic snap fixed to the surface of said cover and receivable by an opening in the side walls of said frame.

5. The assembly of claim 1 wherein said input and output passageways connect to an interior manifold passageway through said interior cavity which terminates at the side walls of said frame to permit simple interconnection of multiple assembly units.

6. The assembly of claim 1 wherein said insulating material is isocyanurate foam.

7. The assembly of claim 1 wherein said absorber plate and said assembly frame are comprised of thermally compatible materials which expand evenly to minimize thermal stress therebetween.

8. The assembly of claim 1 wherein said absorber plate and said assembly frame are composed of thermally compatible plastic materials.

9. A plastic solar collector assembly operable over wide temperature variations and having fluid input and output ports comprising:
   a molded plastic one piece collector frame having oblique side walls and a ribbed surface forming a plurality of passages between the ribs of the ribbed surface;
   a plastic absorber plate thermally compatible with and bonded to said frame contiguous to the ribbed surface such that capillary passages are formed with a leakproof seal therebetween:
   an input passageway integral to said frame extending from the input port of said frame to said capillary passages so as to place said absorber plate in fluid communication with the input port;
   an outlet passageway integral to said frame and connecting said capillary passages to the output port to permit the flow of the fluid from said capillary passages;
   an interior cavity prescribed by said frame being defined by a bottom surface and the side walls of said frame;
   a transparent molded cover for said frame to enclose the upper surface of said frame over said plate;
   mounting means attachable to said cover for securing said cover to said collector frame; and
   high temperature insulation material in said interior cavity and contacting the bottom surface and side walls of said frame.

10. A plastic solar collector assembly operable over wide temperature variations and having fluid input and output ports said assembly comprising:
    a molded one piece plastic collector frame having oblique, depending side walls and a partially ribbed upper surface forming a plurality of passages between the ribs of the upper ribbed surface, said ribbed upper surface having first and second unribbed stand-off regions in communication with said capillary passages, said regions being operative to allow even fluid distribution among said passages;
    a plastic absorber plate thermally compatible with and bonded to said frame about said upper ribbed surface and to said ribs to form capillary passages with a leakproof seal formed therebetween:
    an input passageway integral to said frame connecting the input port of said frame to said first stand-off region so as to place said absorber plate in fluid communication with the input port;
    an outlet passageway integral to said frame and connecting said seconds stand-off region to the output port to permit the flow of fluid from said capillary passages;
    an interior cavity prescribed by said frame being under a bottom surface and between the side walls of said frame;
    a transparent collector assembly cover for mounting to said frame to enclose an area above the upper surface of said from;
    mounting means between said cover and the side walls of said frame for securing said cover to said collector frame; and
    high temperature insulation material in said interior cavity and contacting the bottom surface of said frame.

11. The assembly of claim 10 wherein said first and second standoff regions have a decreasing width in relationship to the distance from the connecting passageway.

12. The assembly of claim 10 wherein said first and second standoff regions are substantially triangular in shape.

13. The assembly of claim 10 wherein said input and output passageways connect to diagonally opposite corner portions of said upper surface.

* * * * *

UNITED STATES PATENT AND TRADEMARK OFFICE
CERTIFICATE OF CORRECTION

PATENT NO. : 4,347,836
DATED : Sep. 7, 1982
INVENTOR(S) : Arthur M. Frank

It is certified that error appears in the above-identified patent and that said Letters Patent are hereby corrected as shown below:

Col. 6, line 41, "internal" should read -- integral --

Signed and Sealed this

Twenty-first Day of December 1982

[SEAL]

Attest:

GERALD J. MOSSINGHOFF

*Attesting Officer*  *Commissioner of Patents and Trademarks*